United States Patent [19]

Karlsson et al.

[11] Patent Number: 4,962,699
[45] Date of Patent: Oct. 16, 1990

[54] DISTRIBUTING APPARATUS

[75] Inventors: Gerd Karlsson, Loftahammar; Kurt Wiebe, Bjuv, both of Sweden

[73] Assignee: Nestec S.A., Vevey, Switzerland

[21] Appl. No.: 160,778

[22] Filed: Feb. 26, 1988

[30] Foreign Application Priority Data

Feb. 28, 1987 [EP]  European Pat. Off. ........ 87102891.6

[51] Int. Cl.⁵ ............................ A23B 4/02; A21C 9/04
[52] U.S. Cl. ...................................... 99/450.1; 99/494;
221/200; 221/265; 221/270
[58] Field of Search .............. 99/494, 450.1, 450.7,
99/450.8; 221/200, 224, 225, 243, 247, 250, 265,
267, 270; 426/289, 295; 366/332

[56] References Cited

U.S. PATENT DOCUMENTS

| | | | |
|---|---|---|---|
| 184,010 | 11/1876 | Hull | 366/332 X |
| 2,032,962 | 3/1936 | Vogt | 99/450.1 |
| 2,566,712 | 9/1951 | Zeun | 99/450.1 |
| 2,837,042 | 6/1958 | Laval, Jr. | 99/450.1 |
| 3,171,371 | 3/1965 | Gray et al. | 221/270 X |
| 4,060,027 | 11/1977 | Jenny | 99/450.1 |
| 4,244,308 | 1/1981 | Vince | 221/267 X |
| 4,699,795 | 10/1987 | Thompson | 426/289 |

FOREIGN PATENT DOCUMENTS

| | | | |
|---|---|---|---|
| 1546876 | 10/1968 | France | 221/267 |
| 681118 | 1/1965 | Italy | 99/450.7 |
| 694276 | 9/1965 | Italy | 99/450.7 |
| 1201104 | 12/1984 | U.S.S.R. | 221/265 |

*Primary Examiner*—Philip R. Coe
*Assistant Examiner*—Stephen F. Gerrity
*Attorney, Agent, or Firm*—Vogt & O'Donnell

[57] ABSTRACT

An apparatus which provides for deposition quasi-spherical objects onto food products includes a horizontal table for feeding the food products beneath a dispensing device which includes a trough, for receiving and containing a supply of the objects to be dispensed, having at least one discharge opening, each discharge opening being connected to a chute which leads downwards towards the table for providing an object from the trough to a flexible strip above the table having an aperture having a border for supporting the object upon the strip aperture. Positioned over the strip aperture is a pusher for forcing the articles through the aperture to be embedded onto the surface of the food product positioned on the table below. For transportion and providing objects from the trough to the trough discharge openings to the chutes, positioned inside the trough is a plate associated with each discharge opening and having at least one aperture, for receiving objects from the trough and transporting the objects, and which, upon rotation of the plate, aligns the objects with a discharge opening for discharge into the chute.

9 Claims, 3 Drawing Sheets

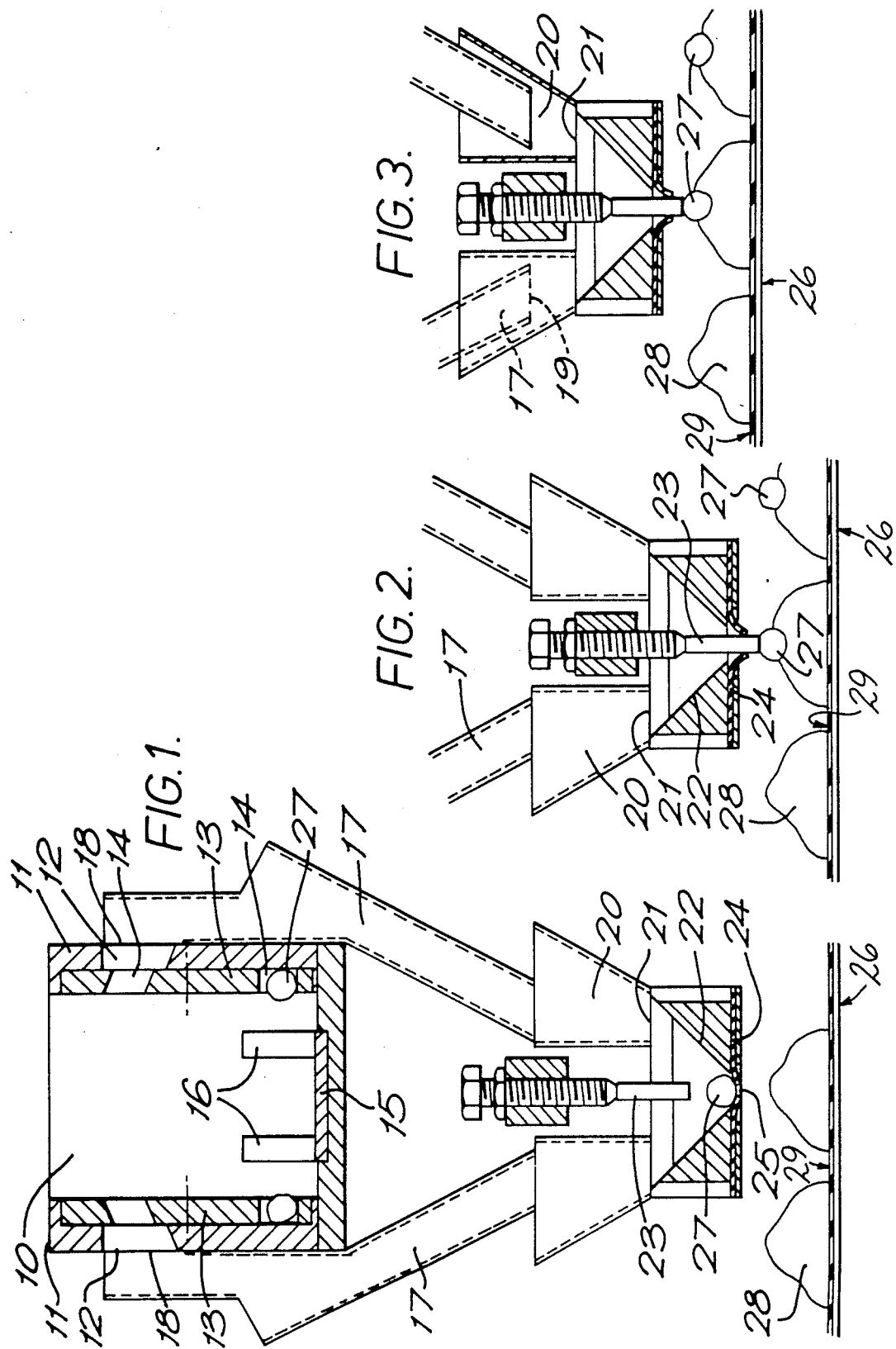

DISTRIBUTING APPARATUS

BACKGROUND OF THE INVENTION

This invention relates to a distributor for spherical or quasi-spherical objects which is intended, in particular, for the application of cherries, pralines, nuts or other similar articles used to enhance the taste and appearance of, and/or to decorate, food products such as confectionery articles, biscuits or ice creams.

Of the known distributors for quasi-spherical objects, the most widely used are of the pneumatic or mechanical type. Pneumatic distributors comprise either means for randomly withdrawing one of the quasi-spherical objects by suction from a pile or, by contrast, means for pulsing said objects by means of compressed air from cavities into which they have previously been introduced and, in either case, for projecting said object onto the receiving product. Mechanical distributors which are very widely used include versions in which needles take up the objects to be placed on the receiving product from a reserve and subsequently transfer them from this reserve to the product and deposit them thereon.

These known distributors, whether of one type or the other, are attended by the disadvantage of generally poor reliability in operation. In addition, mechanical distributors equipped with needles involve a real danger, so far as the food products are concerned, in that needles or fragments of needles can break or become detached and remain in the product without any possibility of detection at the moment the incident occurs, making the end product particularly dangerous to eat. In view of these disadvantages, distribution is still generally done by hand but this involves considerable labour costs.

SUMMARY OF THE INVENTIONS AND SUMMARY OF PREFERRED EMBODIMENTS

The present invention obviates the disadvantages noted above by providing an apparatus and a process for distributing quasi-spherical objects, such as cherries, nuts or pralines, preferably not sticky, and applying them to food products, which is both simple and reliable.

The present invention provides an apparatus and a process for distributing quasi-spherical objects onto a food product characterised in that the objects are placed in a trough having at least one discharge opening in a side wall and having, adjacent to the side wall inside the trough, a rotatable plate having at least one aperture positioned and configured so that when the plate rotates, the aperture in the plate may receive an object and come into alignment with the trough discharge opening, whereupon the object passes from the plate aperture through the discharge opening into a chute, extending downwards from the discharge opening towards the table, through which it falls and emerges to lie on the border of an aperture in a horizontal strip of flexible material. Above each aperture is a pusher.

Positioned beneath the strip of flexible material is a horizontal table. A food product is fed onto the horizontal table so that the food product lies beneath the aperture in the strip, whereupon, the pusher alone reciprocates vertically, or each of the pusher and the horizontal table reciprocate vertically, or the strip of flexible material and the table reciprocate vertically to cause the pusher to force the object lying on the border of the aperture in the strip of flexible material through the aperture onto the upper surface of the food product. The operations are synchronised so that the objects are deposited upon the food product which may be removed by automatic means and the cycle is then repeated. Conveniently, a plurality of quasi-spherical objects are pressed onto a corresponding number of food products in each cycle.

The present invention provides an apparatus for distributing quasi-spherical objects onto a food product characterised in that it comprises:

(a) a trough for receiving said objects provided with at least one discharge opening in a wall;

(b) situated below the trough, a horizontal strip of flexible material having at least one aperture which may be stationary or adapted to reciprocate vertically;

(c) positioned above an aperture in the horizontal strip of flexible material, a pusher which may be stationary or adapted to reciprocate vertically;

(d) extending from the trough to the horizontal strip of flexible material, a chute positioned with its upper opening facing a discharge opening in the wall of the trough and its lower opening above an aperture in the strip of flexible material;

(e) positioned adjacent to and inside the wall of the trough, a plate provided with at least one aperture and adapted to rotate so that an aperture in the plate comes into alignment with a discharge opening in the wall of the trough and the upper opening of the chute, enabling one of the said objects to pass through the discharge opening of the trough into the chute and fall through the lower opening to lie on the border of an aperture of the strip of flexible material;

(f) positioned at a constant distance beneath the strip of flexible material a horizontal table which may be stationary or adapted to reciprocate vertically; and (g) means for feeding a food product onto the horizontal table provided that one or both of the pusher and the horizontal table are adapted to reciprocate vertically converging firstly so causing a said object lying on the border of an aperture in the strip of flexible material to be forced by the pusher through the aperture onto the food product and then diverging.

Since the horizontal table is positioned at a constant distance beneath the strip of flexible material, the latter reciprocates when the horizontal table reciprocates and is stationary when the horizontal table is stationary.

Preferably the trough is elongated with a plurality of discharge openings on each side wall.

Desirably, a means for agitating the quasi-spherical objects is present in the trough, for example, a longitudinally reciprocating plate provided with upstanding projections positioned on the base of the trough.

The strip of flexible material is conveniently made of rubber or soft plastics material, and preferably it is provided with a plurality of apertures, conveniently the same number of apertures as discharge openings of the trough. It will be understood that the size of the apertures in the flexible strip is such that they are too small to allow the quasi-spherical objects to fall through under gravity but large enough to enable the objects to be forced through under pressure, for instance, by a pusher.

The plate is preferably positioned inside the side wall of the trough provided with at least one discharge opening, and is preferably provided with a plurality of apertures arranged in a circle. Advantageously, the plate, itself, is substantially circular.

The lower end of the chute may comprise a hopper, the lower opening of which lies above an aperture in the strip of flexible material and which serves to guide the quasi-spherical objects towards the aperture. The hopper may be movable so that it may reciprocate when the horizontal table and the strip of flexible material reciprocate.

The food product may conveniently be fed onto and discharged from the horizontal table by means of a chain. The food product may be a confectionery product such as a biscuit, cake or ice-cream.

The quasi-spherical object is usually pressed firmly onto the food product and may be partially embedded in the food product.

The present invention is further illustrated by way of example with reference to the accompanying drawings.

BRIEF DESCRIPTION OF THE DRAWINGS

FIG. 1 is a diagrammatic transverse section of the apparatus showing a nut lying on the border of an aperture in a horizontal strip of flexible material;

FIGS. 2 and 3 are diagrammatic transverse sections of the lower part of the apparatus each showing a nut partially embedded in a biscuit;

DETAILED DESCRIPTION OF THE DRAWINGS

Figure 4:
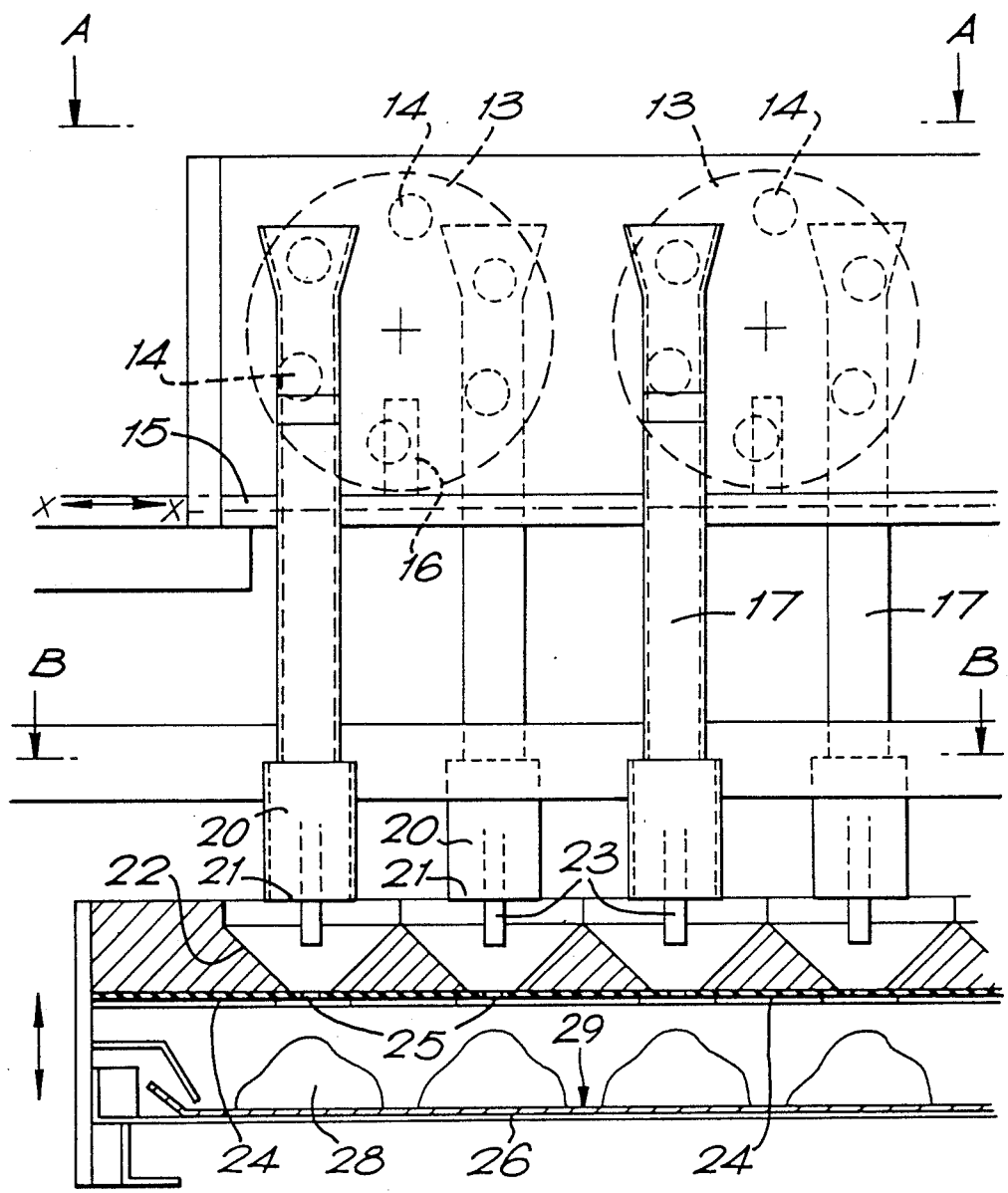
FIG. 4 is a diagrammatic side view of part of the apparatus.

Referring to the drawings, the apparatus comprises a trough 10 having side walls 11 with discharge openings 12, circular plates 13 having apertures 14, a reciprocating plate 15 provided with upstanding lugs 16, chutes 17 having inlet openings 18 and outlet openings 19, a stainless sheet metal hopper 20 having a lower opening 21, guides 22, pusher 23, a rubber strip 24 with apertures 25, and a horizontal table 26. Also shown in the drawings are nuts 27 and biscuits 28 means, such as a chain 29, for feeding food products onto table 26 and moving food products along an upper surface of the table.

Figure 5:
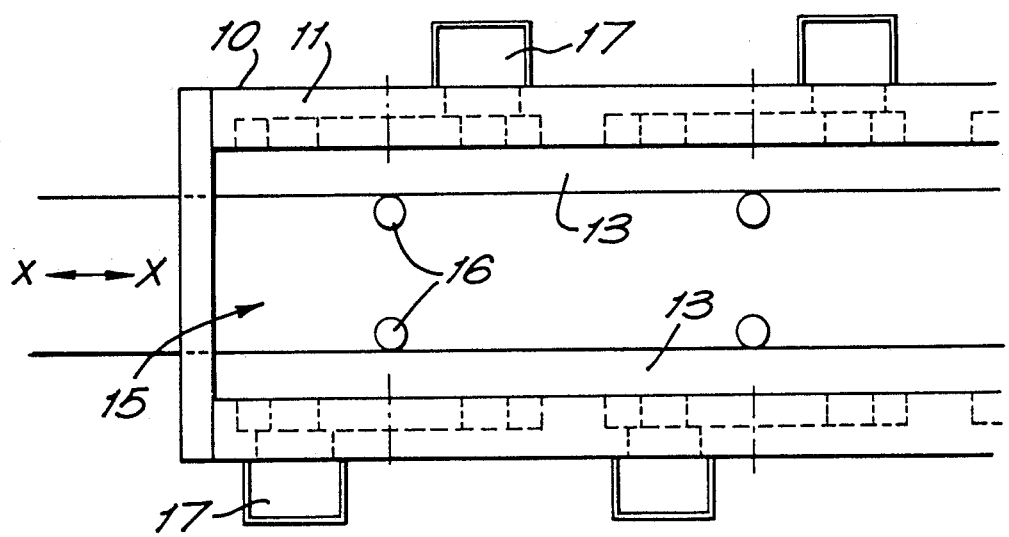
FIG. 5 is a diagrammatic view looking in the direction A—A of FIG. 4.

In operation, the trough 10 is filled with nuts 27 which are vibrated by the plate 15 reciprocating in the direction of the arrows X—X in FIGS. 4 and 5 and the circular plate 13 rotates. When the apertures 14 of the circular plates come into alignment with respective adjacent discharge openings 12 and inlet openings 18, nuts are discharged from the trough, one nut through each discharge opening, pass through the respective inlet openings 18 into the chutes 17, fall by gravity through the outlet openings 19 and through the hopper 20 from which they fall through the lower opening 21 whereupon they are guided by the guides 22 so that they come to rest on the borders of the apertures 25, one for each aperture. The biscuits 28 are fed onto the horizontal table 26 (from left to right in FIGS. 2 and 3) by means of an intermittently moving chain (not shown) so that they lie below the rubber strip 24, one biscuit immediately beneath an aperture 25 respectively.

In the embodiment illustrated in FIG. 2, the horizontal table 26 and the rubber strip 24 are stationary and when a nut 27 has come to rest on an aperture 25 and a biscuit 28 has come to lie immediately beneath the aperture, the chain stops and the pusher 23, driven by a step motor (not shown) then descends to press against the nut and force it through the aperture 25 in the rubber strip 24 and to embed it in the upper surface of the biscuit 28. The pusher then ascends to release the biscuit with the nut embedded therein, which is then transported away by the chain.

In the embodiment illustrated in FIG. 3, the horizontal table 26 reciprocates with the rubber strip and hopper and the pusher 23 is stationary. When the horizontal table is in its lower position a biscuit 28 is fed onto it. When a nut 27 has come to rest on an aperture 25 of the rubber strip which is also in its lower position and a biscuit has come to lie immediately beneath the aperture, the chain stops and the horizontal table together with the rubber strip and hopper ascend to their upper positions causing the nut to be forced by the stationary pusher through the aperture 25 in the rubber strip 24 and become embedded in the upper surface of the biscuit. The horizontal table, rubber strip and hopper then descend to their lower positions, the horizontal table carrying with it the biscuit with the nut embedded therein, which is then transported away by the chain.

Figure 6:
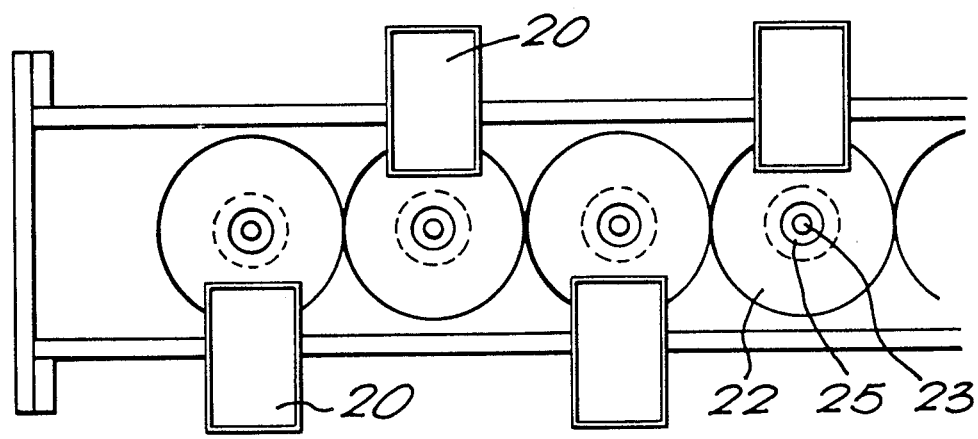
FIG. 6 is a diagrammatic view looking in the direction B—B of FIG. 4.

In the embodiment illustrated in FIGS. 4–6, a plurality of food products 28 are moved on the horizontal table 26 beneath the dispensing device which is positioned above the table and which includes flexible strip 24 and a plurality of apertures 25.

A plurality of chutes 17, equal in number to the number of flexible strip apertures provide for feeding the objects from the trough, which receives and contains a supply of the objects, to each strip aperture border via the hoppers 20 and the guides 21. Positioned above each flexible strip aperture 25 is a pusher 23 for forcing the objects through the strip apertures onto the food products 28. As illustrated, each rotatable plate 13, which is positioned within the trough, has a plurality of apertures 14 configured and positioned to receive and transport the objects in the trough to discharge openings where they are fed into the respective chutes 17. Also provided in the trough is plate 15 having lugs 16 which reciprocate longitudinally for agitating the objects.

All the operations are synchronised by conventional means.

We claim:

1. An apparatus for distributing quasi-spherical objects onto food products comprising:
   a vertically reciprocative horizontal table;
   means for feeding food products onto and moving the food products along an upper surface of the table; and
   a dispensing device positioned above the table for dispensing quasi-spherical objects onto the food products fed and moved along the upper surface of the table, the dispensing device of the apparatus comprising:
   a trough in an upper portion of the dispensing device having side walls and a base for receiving and containing a supply of the quasi-spherical objects to be dispensed on the food products and having at least one discharge opening in at least one side wall through which the objects may be discharged one object at a time;
   a rotatable plate associated with each discharge opening being positioned inside the trough and having at least one aperture therethrough, each discharge opening associated with each plate being positioned and each plate and each aperture in each plate being positioned and configured such that, upon rotation of the plate, each aperture aligns with the associated trough discharge opening and such that each aperture receives one object at a time from the trough and transports the object to the associated discharge opening for being discharged one object at a time from the plate aperture through the associated discharge opening;

a chute associated with each discharge opening extending downwards towards the table for receiving and directing each object discharged from each discharge opening downwards towards the table;

a flexible strip positioned beneath each chute and extending horizontally above the table and having an aperture associated with each chute, the strip aperture being defined by a strip aperture border for receiving and supporting each object to be distributed onto a food product directed to the strip by each chute; and a vertically reciprocative pusher associated with and positioned above each strip aperture for forcing the object supported by the strip aperture border through the aperture onto the food product on the table.

2. An apparatus according to claim 1 further comprising a hopper positioned between each chute and the flexible strip and further comprising guides positioned between the hopper and the strip for directing objects from each chute to each associated strip aperture.

3. An apparatus according to claim 2 wherein the flexible strip, hopper and guides are vertically reciprocative for, upon upward movement of the strip, hopper and guides, together with each pusher, forcing each object to be distributed onto the food product.

4. An apparatus according to claim 1 or 2 further comprising means for agitating the objects in the trough.

5. An apparatus according to claim 1 wherein flexible strip is vertically reciprocative for, upon upward movement of the strip, together with downward movement of each pusher, forcing each object to be distributed onto the food product.

6. An apparatus for distributing quasi-spherical objects onto food products comprising:

a vertically reciprocative horizontal table;

means for feeding food products onto and moving the food products along an upper surface of the table; and a dispensing device positioned above the table for dispensing quasi-spherical objects onto the food products fed and moved along the upper surface of the table, the dispensing device of the apparatus comprising:

a trough in an upper portion of the dispensing device having side walls and a base for receiving and containing a supply of the quasi-spherical objects to be dispensed on the food products and having at least one discharge opening in at least one side wall through which the objects may be discharged one object at a time;

a rotatable plate associated with each discharge opening being positioned inside the trough and having at least one aperture therethrough, each discharge opening associated with each plate being positioned and each plate and each aperture in each plate being positioned and configured such that, upon rotation of the plate, each aperture aligns with the associated trough discharge opening and such that each aperture receives one object at a time from the trough and transports the object to the associated discharge opening for being discharged one object at a time from the plate aperture through the associated discharge opening;

a chute associated with each discharge opening extending downwards towards the table for receiving and directing each object discharged from each discharge opening downwards towards the table;

a vertically reciprocative flexible strip positioned beneath each chute and extending horizontally above the table and having an aperture associated with each chute, the strip aperture being defined by a strip aperture border for receiving and supporting each object to be distributed on a food product directed to the strip by each chute; and a pusher associated with and positioned above each strip aperture for, upon upward vertical movement of the strip, forcing the object supported by the strip aperture border through the aperture onto the food product on the table.

7. An apparatus according to claim 6 further comprising a vertically reciprocative hopper positioned between each chute and the flexible strip and further comprising guides positioned between the hopper and the strip for directing objects from each chute to each associated strip aperture.

8. An apparatus according to claim 6 or 7 further comprising means for agitating the objects in the trough.

9. An apparatus according to claim 8 wherein each pusher is vertically reciprocative for, together with the upward movement of the strip, forcing each object to be distributed through the aperture onto the food product.

* * * * *